March 25, 1958
J. A. MILLER
2,827,805
FIVE SPEED TRANSMISSION EMPLOYING
COMPOUND PLANETARY GEAR SETS
Filed Jan. 18, 1957
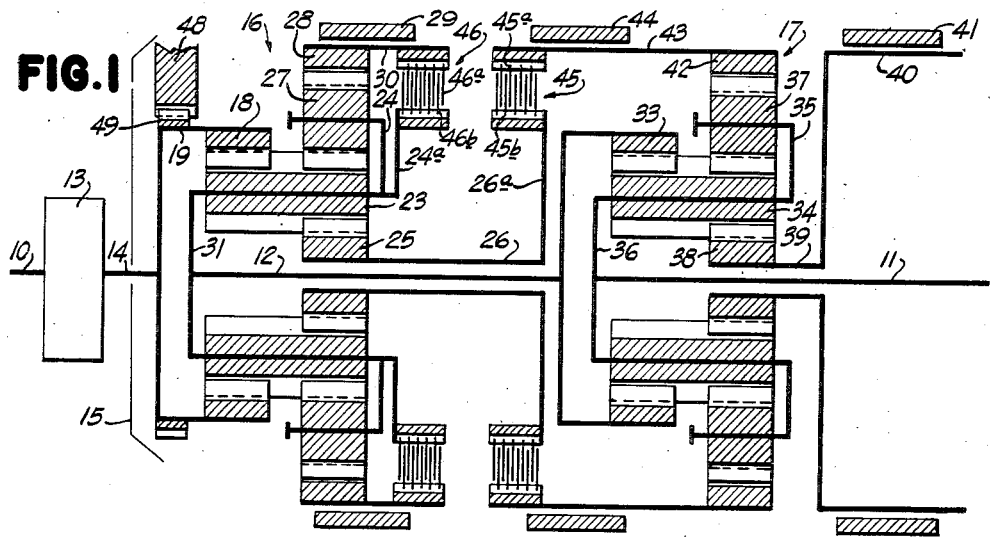
|  | 29 | 44 | 41 | 46 | 45 |
|---|---|---|---|---|---|
| REVERSE | ● |  |  |  | ● |
| FIRST | ● | ● |  |  |  |
| SECOND |  | ● |  |  | ● |
| THIRD |  | ● |  | ● |  |
| FOURTH |  |  | ● | ● |  |
| FIFTH |  |  |  | ● | ● |
FIG. 2
|  | 29 | 44 | 41 | 46 | 45 |
|---|---|---|---|---|---|
| REVERSE | ● |  |  |  | ● |
| FIRST | ● | ● |  |  |  |
| SECOND | ● |  |  | ● |  |
| THIRD |  |  | ● |  | ● |
| FOURTH |  |  | ● | ● |  |
| FIFTH |  |  |  | ● | ● |
FIG. 3
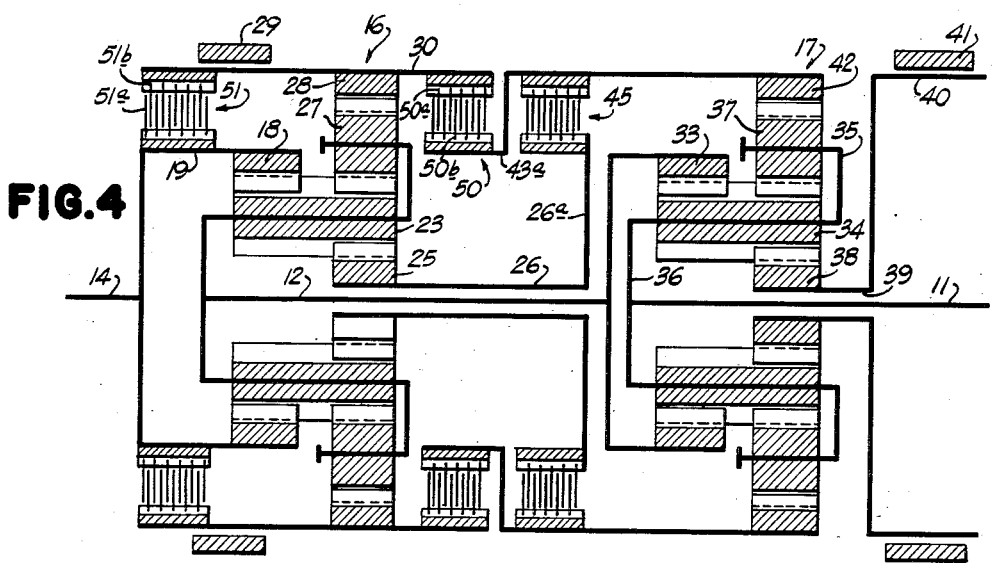
|  | 29 | 41 | 50 | 45 | 51 |
|---|---|---|---|---|---|
| REVERSE | ● |  |  | ● |  |
| FIRST | ● |  | ● |  |  |
| SECOND | ● | ● |  |  |  |
| THIRD |  | ● |  | ● |  |
| FOURTH |  | ● |  |  | ● |
| FIFTH |  |  | ● |  | ● |
FIG. 5
INVENTOR
JAMES A. MILLER
BY *J. Frederick Bechtel*
ATTORNEY United States Patent Office 2,827,805
Patented Mar. 25, 1958

2,827,805

FIVE SPEED TRANSMISSION EMPLOYING COMPOUND PLANETARY GEAR SETS

James A. Miller, Battle Creek, Mich., assignor to Clark Equipment Company, a corporation of Michigan Application January 18, 1957, Serial No. 635,006

20 Claims. (Cl. 74—761)

This invention relates generally to multiple speed transmissions and, more particularly, to five speed planetary transmissions of the type especially well suited for use in trucks or other similar heavy duty vehicles.

The invention has for its principal object the provision of improved transmissions of the type described above characterized by simple, compact construction and simplicity of installation and maintenance.

It is also an object of the invention to provide an improved transmission of the type described above having five forward speed drive ratios and one reverse speed with all ratios being effected by the engagement of controllable friction devices whereby a change of speed ratio may be accomplished without interrupting the flow of torque from the vehicle engine.

It is a further object of the present invention to provide an improved transmission employing five selectively operable friction type devices which are arranged to be actuated in different pairs in order to complete the aforementioned five forward speed ratios and the reverse drive.

A further object of the present invention is the provision of an improved transmission employing a pair of compound, multiple pinion type planetary gear sets so arranged and interconnected that the aforementioned five forward speed ratios and the reverse drive may be effected while employing a minimum number of controllable friction devices.

The invention, both as to its organization and manner of operation, together with further objects and advantages thereof, will best be understood by reference to the specification taken in conjunction with the accompanying drawing, wherein:

Fig. 1 is a diagrammatic view illustrating a first embodiment of the present invention;

Fig. 2 is a table showing the various pairs of controllable friction devices which are engaged to complete the different drive ratios through the transmission illustrated in Fig. 1;

Fig. 3 is a table showing an alternative sequence of energization of the pairs of controllable friction devices which may also be employed to complete five different forward speed drive ratios and a reverse drive through the transmission;

Fig. 4 is a diagrammatic view illustrating a second embodiment of the present invention; and Fig. 5 is a table showing the various pairs of controllable friction devices which are engaged to complete the different drive ratios through the transmission illustrated in Fig. 4.

In accordance with the present invention, the foregoing and other objects are realized by providing a transmission including two compound, multiple pinion type planetary gear sets connected in series between an input shaft and an output shaft. Five selectively operable friction devices associated with the two gearings are adapted to be energized in different pairs in order to provide five forward speed drive ratios and a reverse drive between the input and output shafts.

Referring now to the drawing, and more particularly to Fig. 1 thereof, there is disclosed a mechanism for transferring drive from an engine shaft 10 to a driven or output shaft 11 by way of an intermediate shaft 12 axially aligned with and disposed between the engine shaft and the output shaft. As is illustrated in Fig. 1, the engine shaft 10 may be connected to the impeller of a torque converter or fluid coupling 13 of conventional construction. The turbine of the torque converter is connected to a second intermediate shaft 14 which may be referred to as the input shaft to the transmission. The output shaft 11 is, of course, adapted to be connected through conventional differential gearings and other suitable connecting means to the wheels of the vehicle.

As is customary in transmissions of the type illustrated, the shafts 11, 12 and 14 have mutually telescoping end portions and are journaled within a suitable transmission casing indicated by the reference numeral 15. The latter casing also houses a pair of identical compound, double pinion type planetary gear sets 16 and 17 connected in tandem between the input shaft 14 and the output shaft 11.

The planetary gear set 16 has an input ring gear 18 which is carried upon a sleeve portion 19 secured to the input shaft 14, as, for example, by means of a splined connection. The gear set 16 further comprises a plurality of elongated pinions 23 spaced equal distances apart and rotatably mounted upon a planet carrier 24 with three such pinions preferably being provided. Each of the pinions 23 meshes with the ring gear 18 and with a sun gear 25 formed upon an elongated sleeve 26 encircling a considerable portion of and mounted for rotation about the intermediate shaft 12. Each of the elongated pinions 23 also meshes with a relatively short pinion 27, the latter pinions being spaced equal distances apart and being rotatably mounted upon the planet carrier 24. The short pinions 27 in turn mesh with a second ring gear 28 carried upon an annular brake drum 30 which may be held stationary by means of a fluid operated band brake 29 in order to provide torque reaction for the input gear set 16, thereby to establish a major speed reduction in this gear set.

Planet carrier 24 includes an integral extension 31 which is splined or otherwise secured to the intermediate shaft 12 for the purpose of providing drive for an input ring gear 33 of the output gear set 17. The latter ring gear is, of course, suitably splined or otherwise connected to the shaft 12 and meshes with a plurality of equally spaced, elongated pinions 34 rotatably supported upon a planet carrier 35. The carrier 35 is provided with an integral portion 36 connected to the output shaft 11 in order to complete the drive to the latter shaft from the output gear set 17. The elongated pinions 34 mesh with relatively short pinions 37 rotatably supported upon the planet carrier 35 and also mesh with a sun gear 38 secured to a sleeve 39 which is mounted for rotation about the output shaft 11. The sleeve 39 terminates in an annular brake drum 40 which may be held stationary by means of a fluid operated band brake 41 in order to provide torque reaction for the output gear set 17 and establish a minor speed reduction therein.

The short pinions 37 also mesh with a ring gear 42 attached to an elongated drum 43 encircling the gear set 17, which drum may be held stationary by means of a band brake 44. A fluid operated multiple-disk friction clutch 45 is adapted to connect the drum 43 to the sun gear sleeve 26. This clutch is of conventional construction and includes a plurality of interleaved clutch plates 45a and 45b respectively carried by the drum 43 and by an integral extension 26a of the sun gear sleeve 26. The plates of clutch 45 are disposed within a suitable clutch housing (not shown) and are retained between an annular backing plate and an annular piston which is longitudinally movable within the housing. Biasing springs act against the piston normally to maintain the clutch plates in disengaged condition, so that application of fluid pressure to the face of the piston causes the clutch plates to be moved into frictional engagement, whereupon the ring gear 42 of the gear set 17 is connected directly to the sun gear 25 of the gear set 16.

A second fluid operated clutch generally indicated at 46 serves the purpose of interconnecting the planet carrier 24 and the ring gear 28 of the input gear set 16 in order to lock up the latter gear set and provide a direct drive from the input shaft 14 to the intermediate shaft 12. Specifically, the clutch 46 includes interleaved plates 46a and 46b respectively connected to the brake drum 30 and to an integral extension 24a of the planet carrier 24. The clutch plates of the clutch 46, like those of the clutch 45 previously described, are adapted to be moved into frictional engagement by means of a fluid operated piston not shown.

The transmission casing 15 also houses front and rear pumps (not shown) of conventional construction which perform the functions of pressurizing and feeding oil to the torque converter 13, providing lubrication for the transmission gearing, cooling the friction brakes and clutches, if necessary, and also providing fluid pressure to engage the friction brakes and clutches.

To provide power take-off for driving auxiliary equipment on the vehicle, a reach-in type adapter may be inserted through an opening provided in the transmission casing 15 until its driven gear 48 engages an externally toothed portion 49 formed on the sleeve 19 of the ring gear 18. The provision of power take-off directly from the input shaft 14 insures that the auxiliary equipment will not be affected by the speed reduction provided by the transmission, and the use of the toothed portion 49 permits the adapter to be conveniently installed since it is inserted only a relatively small distance into the casing 15.

As previously indicated, the transmission illustrated in Fig. 1 is particularly well suited for use on trucks or heavy duty vehicles and, to this end, provides a neutral condition, together with five forward speed drive ratios and a single reverse drive. The transmission may be operated either automatically or manually by simultaneously applying different pairs of the clutches and brakes described above. For automatic operation the clutches 45 and 46 and the brakes 29, 41 and 44 may be operated by the selective application of hydraulic pressure from any suitable control mechanism, as will be readily understood by those skilled in this art.

In neutral condition, all three of the brakes and both of the clutches are disengaged, whereupon torque will be transmitted from the vehicle engine through the shaft 10 and the torque converter 13 to the input shaft 14 and from there to the sleeve 19 and the ring gear 18, thereby to effect rotation of the latter ring gear and also to drive the power take-off gear 49. No torque is transmitted either to the intermediate shaft 12 or to the driven shaft 11, in view of the absence of reaction elements in both of the gear sets 16 and 17.

As will be apparent from the study of the table shown in Fig. 2, the first forward speed ratio is established by simultaneously applying the brakes 29 and 44, thereby holding both of the ring gears 28 and 42 stationary in order to effect major speed reductions in both the input and output gear sets. It will be understood that at this time the brake 41 and the clutches 45 and 46 are not engaged. Rotation of the sleeve 19 and the ring gear 18 then causes the drive to pass through the planet pinions 23, through the planet carrier 24 and through the intermediate shaft 12 to the ring gear 33 of the output planetary gear set 17. Power then flows from the ring gear 33 to the planet pinions 34 and then to the planet carrier 35 which is attached to the driven shaft 11.

The second forward speed ratio is obtained by releasing the brake 29 and applying the clutch 45 while holding the brake 44 applied. Application of the clutch 45 locks the sun gear 25 to the engaged band brake 44 in order to place the gear set 16 in minor speed reduction by holding sun gear stationary. The output gear group, of course, remains in major reduction since the brake 44 remains applied.

The third forward speed ratio is obtained by releasing the clutch 45 and actuating the clutch 46, while at the same time holding the brake 44 applied. With the clutch 46 applied, the planet carrier 24 of the input gear set 16 is connected to the ring gear 28 and the input gear set 16 is locked up to provide direct drive from the input shaft 14 to the ring gear 33. The output gear set 17 obviously remains in major speed reduction.

To provide the fourth forward speed ratio, the brake 44 is released and the brake 41 is actuated while the clutch 46 remains applied. Under these conditions, a direct drive is maintained to the ring gear 33, while the application of brake 41 places the output gear set in minor speed reduction by holding the sun gear 38 stationary.

The fifth forward speed drive ratio is obtained by releasing the brake 41 and actuating the clutch 45, while at the same time holding the clutch 46 applied. Under these conditions, the input gear set is locked up for direct drive and the ring gear 42 of the output gear set is connected directly to the sun gear 25. Thus, the output gear set 17 is also locked up and a direct drive is provided from the input shaft 14 to the output shaft 11.

Reverse drive is effected by simultaneously applying the band brake 29 and the clutch 45. As indicated above, major speed reduction is provided in the input gear set 16 when the brake 29 is applied. With the clutch 45 applied, the sun gear 25 of the gear set 16 is connected to drive the ring gear 42 of the gear set 17, with the result that a dual path of power flow from the input gear set to the output gear set is provided. The first such path extends from the ring gear 19 and the planet pinion 23 to the carrier 24 connected to the intermediate shaft 12 and the ring gear 33, while the second path includes the ring gear 18, the pinions 23, the sun gear 25, the clutch 45 and the ring gear 42. The output planetary gear set 17 functions to recombine these two paths of power flow and produces a reverse drive of the driven shaft 11.

As illustrated by the table shown in Fig. 3, a different sequence of energization of the pairs of friction devices may be employed to obtain five forward speed drive ratios and a reverse drive. Thus, the reverse and first forward speed drive ratios are obtained in the manner indicated above. However, the second drive ratio may also be obtained by maintaining the brake 29 applied and releasing the brake 44, while at the same time actuating the brake 41. With the brake 41 applied, the output gear set 17 is placed in minor speed reduction in the manner described previously, while the input gear set 16 obviously remains in major speed reduction.

The third forward speed ratio may then be obtained by applying clutch 45 while maintaining brake 41 applied. With the clutch 45 applied, the sun gear 25 is connected to the ring gear 42 and, as a result, this sun gear receives the reaction of the output planetary gear set 17 and a third forward speed ratio is obtained.

The fourth and fifth forward speed ratios are obtained in the manner described above.

A further modification of the transmission is illustrated in Fig. 4 wherein there is disclosed a transmission generally similar to that described above and illustrated in Fig. 1 and, accordingly, corresponding component parts have been assigned identical reference numerals. In the transmission illustrated in Fig. 4, the lock-up clutch for the input gear set 16 is indicated at 51 and is employed to connect the ring gear 18 to the ring gear 28. Specifically, this lock-up clutch includes interleaved clutch plates 51a and 51b respectively carried upon the ring gear sleeve 19 and upon the brake drum 30, which, in the modification illustrated in Fig. 4, is elongated and extends toward the front end of the transmission. The clutch 51 performs the same function as the clutch 46 described above, in that it interconnects two of the gear elements of the input gear set 16 to provide a direct drive from the input shaft 14 to the intermediate shaft 12.

In the structure illustrated in Fig. 4, the band brake 44 is eliminated and is replaced by a multiple-disk friction clutch indicated at 50. The latter clutch includes clutch plates 50a and 50b which are adapted to be moved into frictional engagement in order to connect the brake drum 30 with an extension 43a carried by the drum 43. Thus, the clutch 50, when energized, connects the ring gear 28 of the input gear set 16 to the ring gear 42 of the output gear set 17.

As will be apparent from the table illustrated in Fig. 5, the first forward speed ratio of the transmission illustrated in Fig. 4 is obtained by simultaneously applying the brake 29 and the clutch 50, thereby to hold the ring gear 28 of the input gear set 16 and the ring gear 42 of the output gear set 17. As previously described, the gear sets 16 and 17 are placed in major speed reduction when their ring gears 28 and 42, respectively, are held stationary.

The second forward speed ratio is obtained by releasing the clutch 50 and applying the band brake 41, while holding the band brake 29 applied. Thus, the input gear set remains in major speed reduction while the output gear set 17 is placed in minor speed reduction by holding the sun gear 38 stationary.

The third forward speed ratio is obtained by applying the clutch 45 and releasing the band brake 29 while maintaining the brake 41 engaged. Under these conditions, the output gear set 17 remains in minor speed reduction, while the ring gear 42 is connected by clutch 45 to the sun gear 25. Thus, the latter sun gear takes its reaction from the output planetary gear set 17 and a third forward speed ratio is obtained.

The fourth forward speed ratio is obtained by releasing the clutch 45 and applying the clutch 51, while maintaining the band brake 41 engaged. The output planetary gear set 17 obviously remains in minor speed reduction, while the input planetary gear set is locked up to provide direct drive from the input shaft 14 to the intermediate shaft 12.

The fifth forward speed ratio is obtained by simultaneously applying the clutches 50 and 51 while releasing the brake 41. As previously described, actuation of both of the clutches 45 and 51 results in a direct drive from the input shaft 14 to the output shaft 11.

Reverse drive is obtained by simultaneously applying the brake 29 and the clutch 45, thereby to provide a dual flow of power in the manner described above. The planetary gear set 17, as previously described, recombines the power flowing from the input gear set 16 and drives the output shaft 11 in a reverse direction and at a speed reduction which is equal to the reduction obtained in the first forward speed ratio.

Thus, the transmissions illustrated in Fig. 4 and that illustrated in Fig. 1 provide five forward speed ratios and a reverse drive between the input and output shafts with each drive being obtained by the simultaneous application of a pair of controllable friction devices. In addition, in both cases, the transition from the first to the fifth speed in each ratio is effected by releasing one controllable device of each pair, thus preventing the interruption of torque from the drive shaft 10.

While particular embodiments of the invention have been shown, it will be understood, of course, that the invention is not limited thereto, since many modifications may be made, and it is therefore contemplated by the appended claims to cover any such modifications as fall within the true spirit and scope of the invention.

What is claimed as new and desired to be secured by Letters Patent of the United States is:

1. In a variable speed transmission the combination of an input shaft; an output shaft; first and second planetary gear sets connected in series between said shafts, each set comprising a plurality of gear elements including a planet carrier, at least one pair of planet gears mounted on said carrier and meshing with each other, a first ring gear meshing with one of said planet gears, a second ring gear meshing with the other planet gear, and a sun gear driven from one of said planet gears; the first ring gear of the first set being operably connected to the input shaft; the planet carrier of the second set being connected to drive the output shaft; and means connecting one of the gear elements of the first gear set to one of the gear elements of the second gear set to provide drive between the two gear sets.

2. In a variable speed transmission the combination of an input shaft; an output shaft; first and second planetary gear sets connected in series between said shafts, each set comprising a plurality of gear elements including a planet carrier, at least one pair of planet gears mounted on said carrier and meshing with each other, a first ring gear meshing with one of said planet gears, a second ring gear meshing with the other planet gear, and a sun gear driven from one of said planet gears; the first ring gear of the first set being operably connected to the input shaft; the planet carrier of the second set being connected to drive the output shaft; and means connecting the planet carrier of the first set to drive the first ring gear of the second set to provide drive between the two sets.

3. In a variable speed transmission the combination of an input shaft; an output shaft; first and second planetary gear sets connected in series between said shafts, each set comprising a plurality of gear elements including a planet carrier, at least one pair of planet gears mounted on said carrier and meshing with each other, a first ring gear meshing with one of said planet gears, a second ring gear meshing with the other planet gear, and a sun gear driven from one of said planet gears; the first ring gear of the first set being operably connected to the input shaft; the planet carrier of the second set being connected to drive the output shaft; means directly interconnecting the first ring gear of the second set and the planet carrier of the first set; means including a first friction device for connecting another of the gear elements of the first set with another of the gear elements of the second set, and four additional friction devices associated with said gear sets, said five friction devices being operable in different pairs to provide a plurality of forward speed drive ratios and a reverse drive between said input and output shafts.

4. In a variable speed transmission the combination of an input shaft; an output shaft; first and second planetary gear sets connected in series between said shafts, each set comprising a plurality of gear elements including a planet carrier, at least one pair of planet gears mounted on said carrier and meshing with each other, a first ring gear meshing with one of said planet gears, a second ring gear meshing with the other planet gear, and a sun gear driven from one of said planet gears; the first ring gear of the first set being operably connected to the input shaft; the planet carrier of the second set being connected to drive the output shaft; means directly connecting the first ring gear of the second set and the planet carrier of the first set; and means including a fluid operated clutch for connecting the sun gear of the first set with the second ring gear of the second set.

5. In a variable speed transmission the combination of an input shaft; an output shaft; first and second planetary gear sets connected in series between said shafts, each set comprising a plurality of gear elements including a planet carrier, at least one pair of planet gears mounted on said carrier and meshing with each other, a first ring gear meshing with one of said planet gears, a second ring gear meshing with the other planet gear, and a sun gear driven from one of said planet gears; the first ring gear of the first set being operably connected to the input shaft; the planet carrier of the second set being connected to drive the output shaft; means directly connecting the first ring gear of the second set and the planet carrier of the first set; means including a first friction device for connecting another of the gear elements of the first set with another of the gear elements of the second set, four additional friction devices cooperating with said first device and with said gear sets to provide five forward speed drive ratios and a reverse drive between said input and output shafts.

6. In a variable speed transmission the combination of an input shaft; an output shaft; first and second planetary gear sets connected in series between said shafts, each set comprising a plurality of gear elements including a planet carrier, at least one pair of planet gears mounted on said carrier and meshing with each other, a first ring gear meshing with one of said planet gears, a second ring gear meshing with the other planet gear, and a sun gear driven from one of said planet gears; the first ring gear of the first set being operably connected to the input shaft; the planet carrier of the second set being connected to drive the output shaft; means directly connecting the first ring gear of the second set and the planet carrier of the first set; means including a fluid operated clutch for connecting the sun gear of the first set with the second ring gear of the second set, a first brake for holding the second ring gear of the first set, a second brake for holding the sun gear of the second set, and means for holding the second ring gear of the second set.

7. In a variable speed transmission, the combination of an input shaft; an output shaft; a pair of planetary gear sets connected in series between said input and output shafts, each set comprising a plurality of gear elements including a planet carrier, at least two planet gears mounted on said carrier and meshing with each other, a first ring gear meshing with one of said planet gears, a second ring gear meshing with another of said planet gears, and a sun gear meshing with said one planet gear; means connecting a first of the gear elements of the first set to be driven by said input shaft; means connecting a second of the gear elements of the first set to drive a first gear element of the second set; means connecting a second gear element of the second set to drive said output shaft; means including a first clutch means for interconnecting two of the gear elements of the first set to establish a direct drive through said first set; means including a second clutch to connect a third gear element of the first set to a third gear element of the second set to establish a direct drive through said second set; first brake means for holding a fourth of the gear elements of the first set to provide a major speed reduction in the first set; second brake means for holding the third gear element of the second set to provide a major speed reduction in the second set; third brake means for holding a fourth of the gear elements of the second set to provide a minor speed reduction in said second set; said first, second and third brake means and said first and second clutch means being selectively engageable in predetermined sequence to establish a plurality of forward speed drives of said output shaft.

8. In a variable speed transmission the combination of an input shaft; an output shaft; a pair of planetary gear sets connected in series between said input and output shafts; each set comprising a plurality of gear elements including a planet carrier, at least two planet gears mounted on said carrier and meshing with each other, a first ring gear meshing with one of said planet gears, a second ring gear meshing with another of said planet gears, and a sun gear meshing with said one planet gear; means connecting a first of the gear elements of the first set to be driven by said input shaft; means connecting a second gear element of the first set to drive a first gear element of the second set; means connecting a second gear element of the second set to drive said output shaft; means including a first friction device for locking up the gear elements of the first set to establish a direct drive through said first set; means including a second friction device to connect a third gear element of the first set to a third gear element of the second set; means including a third friction device for holding a fourth of the gear elements of the first set to provide a major speed reduction in the first set; means including a fourth friction device for holding a fourth of the gear elements of the second set to provide a minor speed reduction in the second set; means including a fifth friction device for holding the third gear element of the second set to provide a major speed reduction in said second set; said five friction devices being selectively engageable to establish a plurality of forward speed drive ratios between said input shaft and said output shaft.

9. The apparatus defined by claim 8 wherein said five friction devices are engageable in different pairs to provide at least five forward speed drive ratios and a reverse drive.

10. In a variable speed transmission the combination of an input shaft; an output shaft; a pair of planetary gear sets connected in series between said input and output shafts; each set comprising a plurality of gear elements including a planet carrier, at least two planet gears mounted on said carrier and meshing with each other, a first ring gear meshing with one of said planet gears, a second ring gear meshing with another of said planet gears, and a sun gear meshing with said one planet gear; means connecting the first ring gear of the first set to be driven by said input shaft; means connecting the planet carrier of the first set to drive the first ring gear of the second set; means connecting the planet carrier of the second set to drive said output shaft; means including a first friction device to establish a direct drive from said input shaft to the first ring gear of the second set; means including a second friction device for connecting the sun gear of the first set to the second ring gear of the second set; means including a third friction device for holding the second ring gear of the first set to provide a major speed reduction in the first set; means including a fourth friction device for holding the second ring gear of the second set to provide a major speed reduction in the second set; means including a fifth friction device for holding the sun gear of the second set to provide a minor speed reduction in said second set; said five friction devices being selectively engageable to establish a plurality of forward speed drive ratios between said input shaft and said output shaft.

11. The apparatus defined by claim 10 wherein said five friction devices are engageable in different pairs to provide five forward speed drive ratios and a reverse drive.

12. In a variable speed transmission the combination of an input shaft; an output shaft; an intermediate shaft; a pair of planetary gear sets connected in series between said input shaft and said output shaft; each set comprising a plurality of gear elements including a planet carrier, at least two planet gears mounted on said carrier and meshing with each other, a first ring gear meshing with one of said planet gears, a second ring gear meshing with another of said planet gears, and a sun gear meshing with said one planet gear; the first ring gear of the first set being secured to said input shaft; the planet carrier of the first set and the first ring gear of the second set being secured to said intermediate shaft; means connecting the planet carrier of the second set to drive said output shaft; means including a first friction device for providing a direct drive through said first set; means including a second friction device for connecting the sun gear of the first set and the second ring gear of the second set; means including a third friction device for holding the second ring gear of the first set; means including a fourth friction device for holding the second ring gear of the second set; means including a fifth friction device for holding the sun gear of the second set; said five friction devices being selectively engageable to establish a plurality of forward speed drive ratios and a reverse drive of said output shaft.

13. The apparatus defined by claim 12 wherein said five friction devices are engageable in different pairs to provide five forward speed ratios between said input shaft and said output shaft.

14. In a variable speed transmission for vehicles having an engine; the combination of a drive shaft driven from the engine; a driven shaft; first and second intermediate shafts axially aligned with respect to each other and to said drive shaft and said driven shaft; fluid means including a drive element mounted on said drive shaft and a driven element carried by said first intermediate shaft for driving said first intermediate shaft from said drive shaft; a pair of planetary gear sets connected in series between said first intermediate shaft and said driven shaft, each set comprising a plurality of gear elements including a planet carrier, at least one pair of planet gears mounted on said carrier and meshing with each other, a first ring gear meshing with one of said planet gears, a second ring gear meshing with the other planet gear, and a sun gear meshing with said one planet gear; means connecting the first ring gear of the first set to be driven by said first intermediate shaft; the first ring gear of the second set being mounted upon said second intermediate shaft; the planet carrier of the first set being connected to drive the second intermediate shaft; means connecting the planet carrier of the second set to drive said driven shaft; a first friction device for providing direct drive through said first set; means including a second friction device to interconnect the sun gear of the first set and the second ring gear of the second set; means including a third friction device for holding the second ring gear of the first set; means including a fourth friction device for holding the second ring gear of the second set; and means including a fifth friction device for holding the sun gear of the second set; said five friction devices being selectively engageable to provide a plurality of forward speed drive ratios and a reverse drive between said drive shaft and said driven shaft.

15. The apparatus defined by claim 14 wherein said five friction devices are engageable in different pairs to provide five forward speed drive ratios between said drive shaft and said driven shaft.

16. In a variable speed transmission for vehicles having an engine; the combination of a drive shaft driven from the engine; a driven shaft; first and second intermediate shafts axially aligned with respect to each other and to said drive shaft and said driven shaft; fluid means including a drive element mounted on said drive shaft and a driven element mounted on said first intermediate shaft for driving said first intermediate shaft from said drive shaft; a pair of planetary gear sets connected in series between said first intermediate shaft and said driven shaft, each set comprising a plurality of gear elements including a planet carrier, at least one pair of planet gears mounted on said carrier and meshing with each other, a first ring gear meshing with one of said planet gears, a second ring gear meshing with the other planet gear, and a sun gear meshing with said one planet gear; means connecting the first ring gear of the first set to be driven by said first intermediate shaft; the first ring gear of the second set being mounted upon said second intermediate shaft; the planet carrier of the first set being connected to drive the second intermediate shaft; means connecting the planet carrier of the second set to drive said driven shaft; a first friction device for connecting two of the gear elements of the first set in order to provide direct drive through the first gear set; a second friction device connecting the sun gear of the first set and the second ring gear of the second set; means including a third friction device for holding the second ring gear of the first set to provide major speed reduction in the first gear set; means including a fourth friction device for holding the second ring gear of the second set to provide major speed reduction in the second set; and means including a fifth friction device for holding the sun gear of the second set to proivde minor speed reduction in the second gear set; said five friction devices being operable in different pairs to establish five forward speed drive ratios and a reverse drive between said drive shaft and said driven shaft.

17. In a variable speed transmission for vehicles having an engine; the combination of a drive shaft driven from the engine; a driven shaft; first and second intermediate shafts axially aligned with respect to each other and to said drive shaft and said driven shaft; fluid means including a drive element connected to said drive shaft and a driven element mounted on said first intermediate shaft for driving said first intermediate shaft from said drive shaft; a pair of planetary gear sets connected in series between said first intermediate shaft and said driven shaft, each set comprising a plurality of gear elements including a planet carrier, at least one pair of planet gears mounted on said carrier and meshing with each other, a first ring gear meshing with one of said planet gears, a second ring gear meshing with the other planet gear, and a sun gear meshing with said one planet gear; means conecting the ring gear of the first set to be driven by said first intermediate shaft; the ring gear of the second set being mounted upon said second intermediate shaft; means connecting the planet carrier of the first set to drive the second intermediate shaft; means connecting the planet carrier of the second set to drive said driven shaft; a first clutch for connecting two of the gear elements of the first set in order to provide direct drive through said first set; means including a second clutch for connecting the sun gear of the first set to the second ring gear of the second set; first brake means for holding the second ring gear of the first set to provide major speed reduction in the first set; second brake means for holding the second ring gear of the second set to provide major speed reduction in the second set; and third brake means for holding the sun gear of the second set to provide minor speed reduction in the second gear set; said two clutches and three brake means being selectively operable in different pairs to provide at least five forward speed drive ratios and a reverse drive between said drive shaft and said driven shaft.

18. In a variable speed transmission for vehicles having an engine; the combination of a drive shaft driven from the engine; a driven shaft; first and second intermediate shafts axially aligned with respect to each other and to said drive shaft and said driven shaft; fluid means including a drive element connected to said drive shaft and a driven element mounted on said first intermediate shaft for driving said first intermediate shaft from said drive shaft; a pair of planetary gear sets connected in series between said first intermediate shaft and said driven shaft, each set comprising a plurality of gear elements including a planet carrier, at least one pair of planet gears mounted on said carrier and meshing with each other, a first ring gear meshing with one of said planet gears, a second ring gear meshing with the other planet gear, and a sun gear meshing with said one planet gear; means connecting the first ring gear of the first set to be driven by said first intermediate shaft; the first ring gear of the second set being mounted upon said second intermediate shaft; means connecting the planet carrier of the first set to drive the second intermediate shaft; means connecting the planet carrier of the second set to drive said driven shaft; a first clutch means for connecting two gears elements of the first set to provide direct drive through said first set; means including a second clutch for connecting the sun gear of the first set to the second ring gear of the second set; first brake means for holding the second ring gear of the first set to provide major speed reduction in the first set; second brake means for holding the second ring gear of the second set to provide major speed reduction through the second set; third brake means for holding the sun gear of the second set to provide minor speed reduction in the second set; said first and second brake means when engaged being operative to hold their associated gear elements to establish a low ratio drive from said drive shaft to said driven shaft; said second brake means and said first clutch means when jointly operated being effective to establish a second ratio drive, said second brake means and said first clutch means when jointly operated being effective to establish a third ratio drive, said third brake and said first clutch means when jointly operated being effective to establish a fourth ratio drive, said first and second clutch means when jointly operated being effective to establish fifth ratio direct drive between said drive shaft and said driven shaft, and said first brake means and said second clutch means being effective when simultaneously operated to establish reverse drive of said driven shaft.

19. The transmission defined by claim 11 wherein the first forward speed ratio is effected by engagement of the third and fourth friction devices, the second forward speed ratio is effected by engagement of the third and fifth friction devices, the third forward speed ratio is effected by engagement of the second and fifth friction devices, the fourth forward speed ratio is effected by engagement of the first and fifth friction devices, the fifth forward speed ratio is established by engagement of said first and second friction devices, and the reverse drive is established by engagement of said second and third friction devices.

20. The transmission defined by claim 11 wherein the first forward speed ratio is effected by engagement of said third and fourth friction devices, the second forward speed ratio is effected by engagement of said third and fifth friction devices, the third forward speed ratio is established by engagement of said second and fifth friction devices, the fourth forward speed ratio is established by engagement of said first and fifth friction devices, the fifth forward speed ratio is obtained by engagement of said first and fourth friction devices, and reverse drive is obtained by engagement of said second and third friction devices.

No references cited.